United States Patent [19]

Siversson

[11] Patent Number: 4,798,575
[45] Date of Patent: Jan. 17, 1989

[54] METHOD AND APPARATUS FOR THE MANUFACTURE OF FILTERS

[75] Inventor: Per-Erik Siversson, Munkedal, Sweden

[73] Assignee: Flodins Filter AB, Lvsekil, Sweden

[21] Appl. No.: 32,728

[22] PCT Filed: Jun. 19, 1986

[86] PCT No.: PCT/SE86/00300
§ 371 Date: Feb. 20, 1987
§ 102(e) Date: Feb. 20, 1987

[87] PCT Pub. No.: WO86/07580
PCT Pub. Date: Dec. 31, 1986

[30] Foreign Application Priority Data

Jun. 20, 1985 [SE] Sweden ................................ 8503078

[51] Int. Cl.⁴ ................................................ B05B 1/14
[52] U.S. Cl. ........................................ 493/346; 493/347;
493/359; 493/381; 493/382; 493/941; 156/474
[58] Field of Search ............... 493/335, 337, 359, 381,
493/382, 401, 402, 403, 410, 463, 940, 941, 346,
347; 156/197, 324, 474, 469; 264/286, 287

[56] References Cited

U.S. PATENT DOCUMENTS

| | | | |
|---|---|---|---|
| 1,348,846 | 8/1920 | Brown et al. | 493/415 |
| 3,321,345 | 5/1967 | Duncan | 156/474 |
| 3,809,199 | 5/1974 | Bessiere | 493/941 |
| 3,959,056 | 5/1976 | Caplan | 156/324 |
| 3,998,140 | 12/1976 | André | 493/941 |
| 4,045,012 | 8/1977 | Jakob | 493/415 |
| 4,128,678 | 12/1978 | Metcalfe et al. | 156/197 |

*Primary Examiner*—Frederick R. Schmidt
*Assistant Examiner*—Robert Showalter

[57] ABSTRACT

A method and apparatus for the manufacture of filters in which a filter material in the form of a continuous length (5) is folded to form pleats (39). The pleats are attached to their ends along the lateral edges of the filter material and are sealed in this way one against the other so as to form a flow path for the medium which is to be filtered into the spaces between the pleats on one side of the filter material, through the material, and out into the spaces between the pleats on the other side of the filter material. During the process of attaching the ends of the pleats to one another, the pleats are kept separated from one another by a pre-determined distance between their outer folded edges by means of a device (18) provided with a number of combs (20) which extend inside the pleats and hold them in this way at the aforementioned pre-determined distance from one another.

3 Claims, 4 Drawing Sheets

METHOD AND APPARATUS FOR THE MANUFACTURE OF FILTERS

TECHNICAL FIELD

The present invention relates to a method and an apparatus for the manufacture of filters, and more specifically filters made from a folded continuous length of a thin material, in particular paper having a certain pre-determined pore size and pore density which only permits particles of less than a certain size range to pass through. The size of the filter is adapted for this purpose to fit precisely in a filter housing with two openings between which the filter is positioned, in conjunction with which the lateral edges of the filter are sealed, as a general rule by gluing or by bonding-on of a strip, so that a medium which is contaminated by particles can be forced through the filter material.

BACKGROUND

Filters of this kind have already been disclosed. Their manufacture involves folding a continuous length of paper, in conjunction with which the size of the pleats and their positions in relation to one another are determined by precise and uniform folding of the paper and by feeding the paper for securing by means of gluing or the bonding-on of an edge strip. The form imparted to the pleats is determined by the conditions associated with the manufacture of the pleats and the feeding of the continuous length of folded material, and variations in these conditions and in the characteristics of the paper will result in uneven pleats, which are then secured in the state which has been imparted to them.

TECHNICAL PROBLEM

In filters of the kind to which the invention relates, the surface area of the filter material is of major significance to factors such as the flow resistance and the take-up capacity, and is determined on the one hand by the size of the filter element and on the other hand by the depth and the density of the individual pleats. The overall size of the filter is usually restricted by the available space inside the filter housing. Because the external dimensions of the filter are restricted, the design of the pleats must be utilized in order to obtain a sufficient filter area for an optimum combination to be achieved between the depth of the pleats and their distance one from the other. Problems are caused by deep plates, however, in particular in the case of large filters, since the filter material becomes unsteady and the pleats tend to collapse, so that only a part of the surface area of the filter can be used. The closeness of the pleats is limited by the requirement for the medium which is to be filtered to be provided with sufficient space to be able to flow into the pleats. Furthermore, filters with close pleats become choked more rapidly by the particles, which limits the service life of the filter. In the case of deep pleats the pleats must be sparsely distributed, since the distance to be covered by the medium as it flows between the sides of the pleats is greater.

A major requirement exists in many areas for the filtration of a medium contaminated with particles through filters which possess good flow characteristics and at the same time exhibit stability such that the pleats do not show a tendency to collapse or to be deformed in some other way by the pressure of the medium being filtered against the filter element, or by vibrations or shocks. The need for stable filters offering good flow characteristics for the medium through the filter element is particularly great in the area of automobile filters, through which considerable quantities of air must pass in a given unit of time and which are constantly subjected to vibrations and shocks. Considerable technical development has meant that present-day automobile engines are now more sensitive than previously to external interference, such as dust and asphalt particles, with the associated risk of functional breakdowns, at the same time as the period between filter replacements is being extended, which has led to increased demands being placed on the filters. In the case of previously disclosed filters and the methods for their manufacture, these demands could not be satisfied in an optimum fashion due to the fact that uneven pleats were produced, resulting in imperfect utilization of the take-up capacity of the filter.

THE SOLUTION

The desired uniformity of the pleats is achieved whilst attaching the ends of the pleats to one another by keeping the pleats separated from one another at a pre-determined distance between their external folded edges by means of a device provided with a number of combs so arranged as to be present inside the pleats, in this way keeping them at the aforementioned pre-determined distance one from the other.

This is achieved in the invention by means of an apparatus consisting on the one hand of a device exhibiting a number of combs so arranged as to be present inside the pleats for the purpose of separating the pleats and keeping them at a pre-determined distance one from the other, and on the other hand of other devices to either side of the folded continuous length of filter material with movable elements so arranged as to produce the attachment of the ends of the pleats.

In a preferred embodiment of the apparatus the first-mentioned device has the form of a screw with a specific pitch, the threads of which form the combs, whilst the other devices consist of conveyors which apply, preferably by means of an adhesive process, strips of fabric along the lateral edges of the continuous length of filter material so as to join together the ends of the pleats. The movable elements of the conveyors in the form of belts are so arranged as to run along the continuous length of filter material and as to force the strips of fabric against its lateral edges, in conjunction with which the screw device and the conveyors interact during movement of the folded continuous length of filter material.

ADVANTAGES

The invention makes available a method for the manufacture of a filter in which the pleats in the filter material are secured to provide permanent attachment so as to eliminate the aforementioned problems and so as to obtain the maximum usable filter surface area.

Also made available by the invention is an apparatus which, during manufacture, permits the aforementioned securing and provides a steady attachment for the filter material so as to achieve a uniform distance between the pleats.

BRIEF DESCRIPTION OF THE DRAWINGS

The invention is described below in more detail in relation to an illustrative embodiment with reference to the accompanying drawings, of which.

PREFERRED EMBODIMENT

Figure 1:
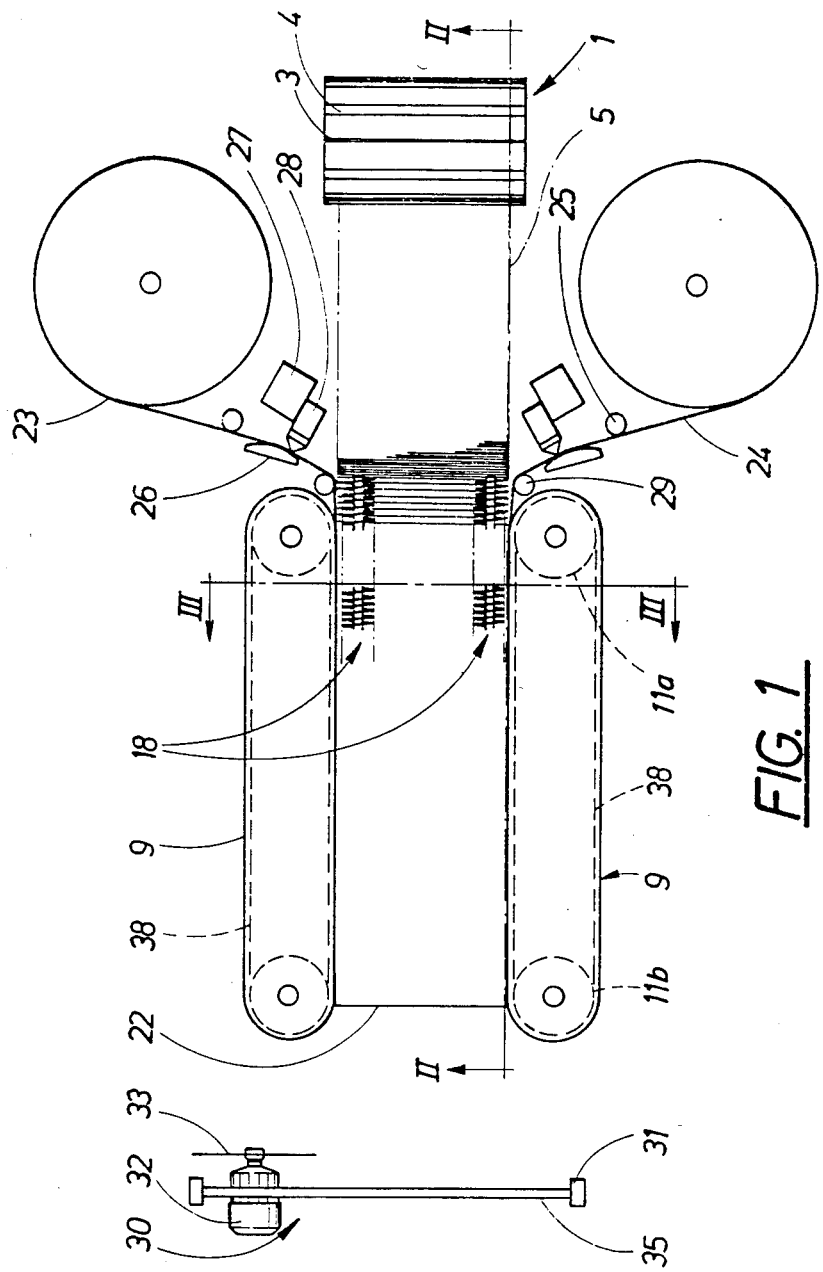
FIG. 1 shows a view from above of a part of a production line including a machine for the manufacture of filters.
Figure 2:
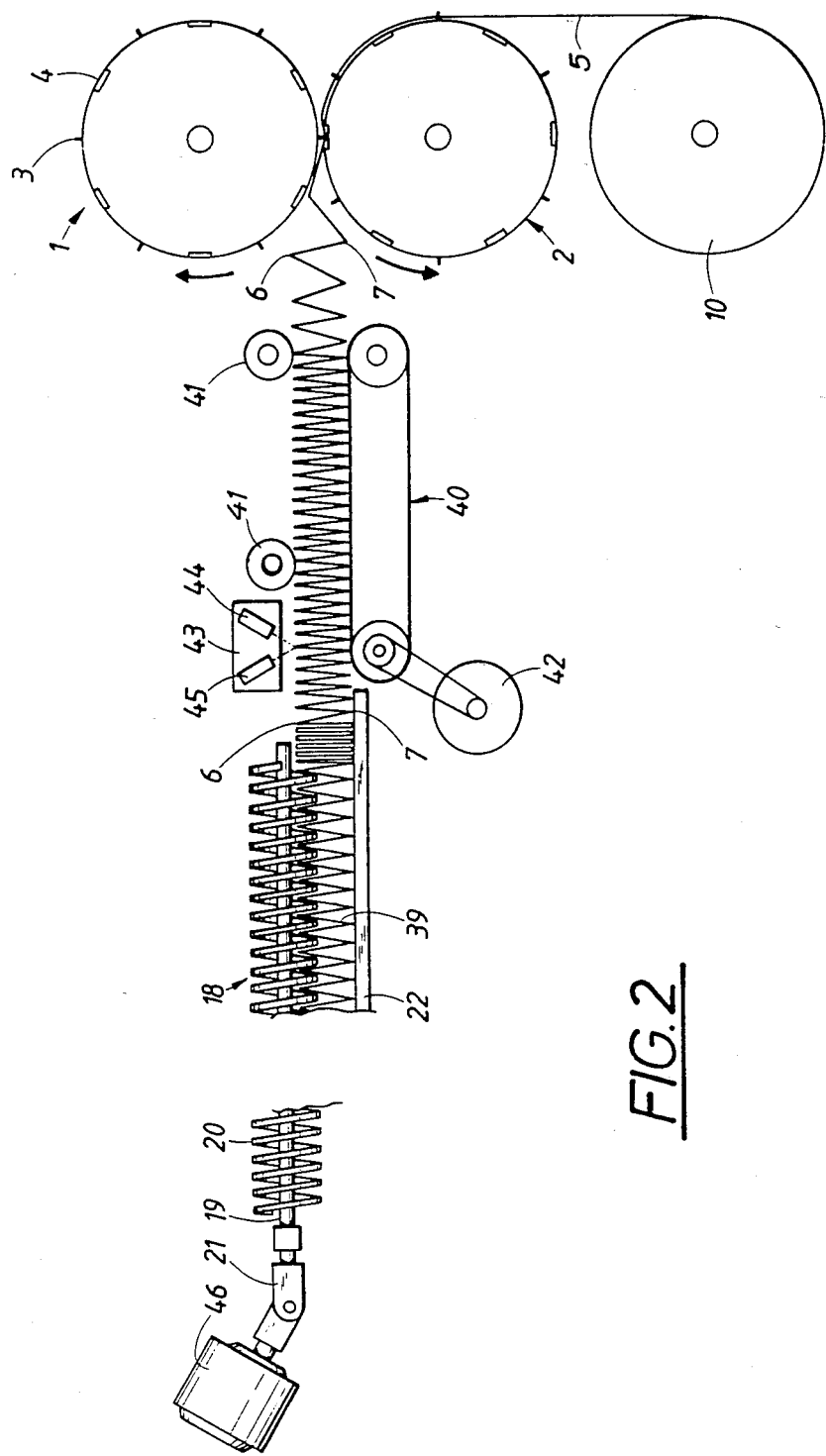
FIG. 2 shows a partially cut-away section along the line II—II in FIG. 1 of the aforementioned production line.

The manufacture of filters takes place in accordance with the invention at a number of stations, as illustrated schematically in FIGS. 1 and 2, in conjunction with which a first station (see FIG. 2 in particular) includes two cylinders 1, 2 rotatable on horizontal shafts, which cylinders are situated close to one another, each cylinder being provided alternately on its contact surface with outward-facing folding strips 3 and recesses 4, preferably provided with strips of an elastomer material. The folding strips on the first cylinder 1 are intended to lie directly in line with the recesses on the second cylinder 2, and vice versa, during rotation of the cylinder. There extends between the cylinders a continuous length 5 of a filter material with a certain pore size and pore density which is fed from a storage roll 10 of the material, in conjunction with which the folding strips 3 and the recesses 4 are intended to interact and to process the filter material in such a way that alternate inner folds 6 and outer folds 7, known as creases, are formed across the direction of feed of the filter materail, which creases in turn form pleats 39, as shown in FIG. 2.

The first station is followed by a second station for accepting and adjusting the folded continuous length of filter material. The continuous length is passed from the cylinders 1, 2 upwards onto a conveyor 40 which is driven in such a way that its upper part, against which the continuous length of filter material rests with its lower pleats, moves away from the cylinders 1, 2. The speed of the conveyor is adjustable by means of a variable-speed electric motor 42. The speed is adapted in this case to the output speed of the cylinders 1, 2 in such a way that the continuous length of filter material is compressed so as to form pleats with a certain density. The pleats in this case should preferably be more dense on the conveyor than they are required to be in the finished filter, and they are separated from one another for attachment purposes in a manner which will be described in conjunction with the description of a third station. Space is saved in this way in the second station in proportion to the extent to which the pleats should be more widely distributed.

The feed speed of the conveyor 40 thus determines the density of the pleats. The height above the folded continuous length of filter material is dependent on the density of the pleats; the denser the pleats, the higher the continuous length of filter material. Situated above the continuous length of filter material are rollers 41, and the filter material is required to be advanced between these rollers and the conveyor. The rollers will not permit the pleats to be compressed by more than a certain amount, since the pleats will become too high to pass beneath the rollers if they are compressed to a greater amount. In this way the conveyor and the rollers will together provide regulation of the height of the pleats, which will result in the feeding of uniform pleats.

At the point where the folded continuous length of filter material leaves the conveyor 40, there is positioned an apparatus 43 for counting the edges of the pleats as they pass by. The apparatus 43 is shown here as an optical apparatus with a light source 44 and a photo-sensor 45. Increased reflection against the photo-sensor occurs as an edge passes by the light source, thereby indicating that a pleat is passing by. The apparatus is, as indicated, connected to the variable-speed motor 42 for driving the conveyor 40 in such a way that the speed of the continuous length of filter material is adapted to permit the feeding of a certain number of pleats per unit of time in accordance with what is stated later.

As illustrated in FIGS. 1 and 2, a third station is situated after the second station. This station consists of conveyors 9 installed on a supporting frame 8 vertically along the direction of movement of the filter material 5, preferably being a belt-type of conveyor consisting of conveyor belts 38 which run in an endless fashion between guide rollers 11a and driving rollers 11b. The driving rollers and the guide rollers are installed in an adjustable fashion on the supporting frame by means of supporting elements 12. The driving rollers are also in driving engagement with a drive shaft 13, so arranged as to be rotatable in the supporting frame, via a conical gear 14 consisting of conical gear wheels 15, for which purpose the gear wheels mounted on the drive shaft are fixed in a position in contact with the gear wheels of the driving rollers by means of locking rings 16. The drive shaft is rotatably mounted in bearing points in the supporting frame 8 and with one of its ends securely attached to a power source 17 arranged in the aforementioned supporting frame, preferably an electric motor as illustrated in FIG. 3.

Arranged inside, at a certain distance from and parallel to the conveyors 9 are preferably two horizontal, elongated screw elements 18, each consisting essentially of a metal strip or comb 20 extending peripherally around a shaft 19 with a certain pitch running along the shaft, said shaft having its end supported in bearing points not shown in the drawings. Furthermore, one end part of each of the screw elements 18 is provided with a coupling 21, preferably of the universal joint type, for driving by means of a power source 46. The screw elements can also be connected to the power source 17 for the conveyors. The drive arrangement is provided with a revolution counter which records the number of revolutions of the screw elements 18 per unit of time. This counter is connected to the apparatus 43, which will be described later. The creased continuous length of filter material 5 can also be fed by a belt conveyor or, as shown here, by sliding on a table 22 arranged beneath the conveyors 12 and the screw elements 18.

Storage drums 23 are rotatably mounted about vertical shafts to either side of and at a certain distance from the creased continuous length of filter material 5 at the end of the conveyors 9 facing towards the cylinders 1, 2, onto which storage drums there is wound an elongated, dimensionally stable strip material 24, preferably made of paper, as illustrated in FIG. 1. The strip material 24 is able to extend from either storage drum 23 past a backing roller 25 and onwards between a shoe 26 exhibiting a slightly convex surface which can be heated and an automatic adhesive applicator 27 equipped with an adhesive magazine 28 situated opposite the shoe and installed on the other side of the strip material 24. Each materail strip 24 also extends past and around a second guide roller 29 installed in a position ahead of the guide roller 11a of the conveyor, and in between the conveyor and the lateral edge of the creased continuous length of filter material 5.

Figure 3:
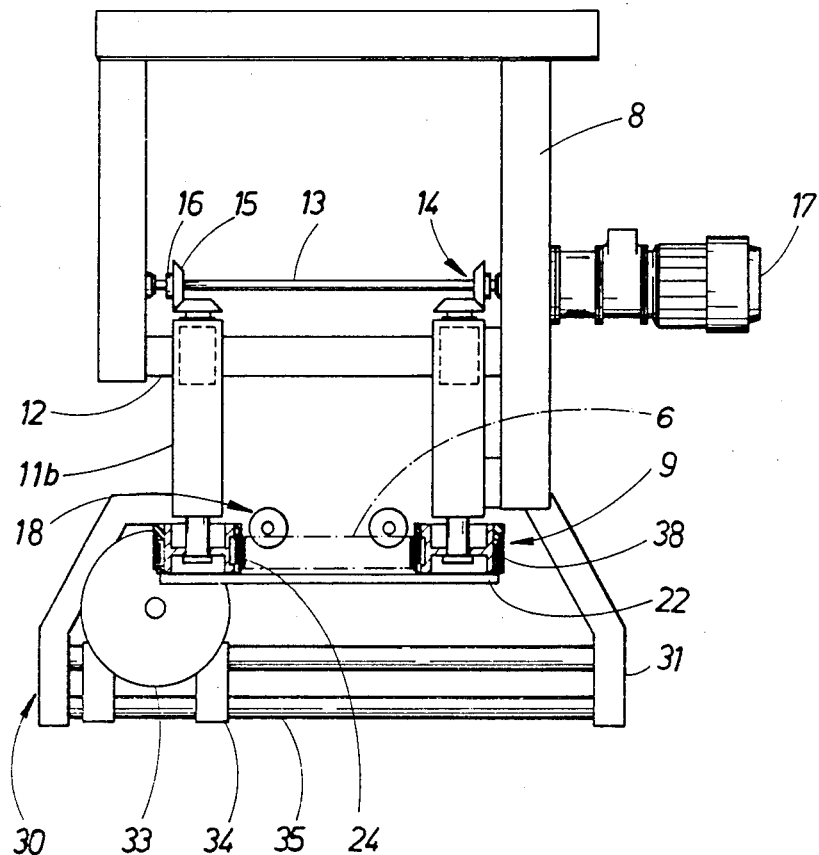
FIG. 3 shows a partially cut-away section along the line III—III in FIG. 1 of the production line viewed from the front.

Positioned after the aforementioned third station, as shown in FIGS. 1 and 3, is a cutting arrangement 30 of a previously disclosed type, such as a flying saw, comprising a second supporting frame 31 which is moved intermittently betwen two extreme positions in the longitudinal sense of the conveyors by means of a drive (not shown), and a saw consisting essentially of a second power source 32, such as an electric motor, and a circular saw blade 33. The saw arrangement is movably installed by means of supporting arms 34 on guides 35 across the direction of feed of the creased continuous length of filter material.

Figure 4:
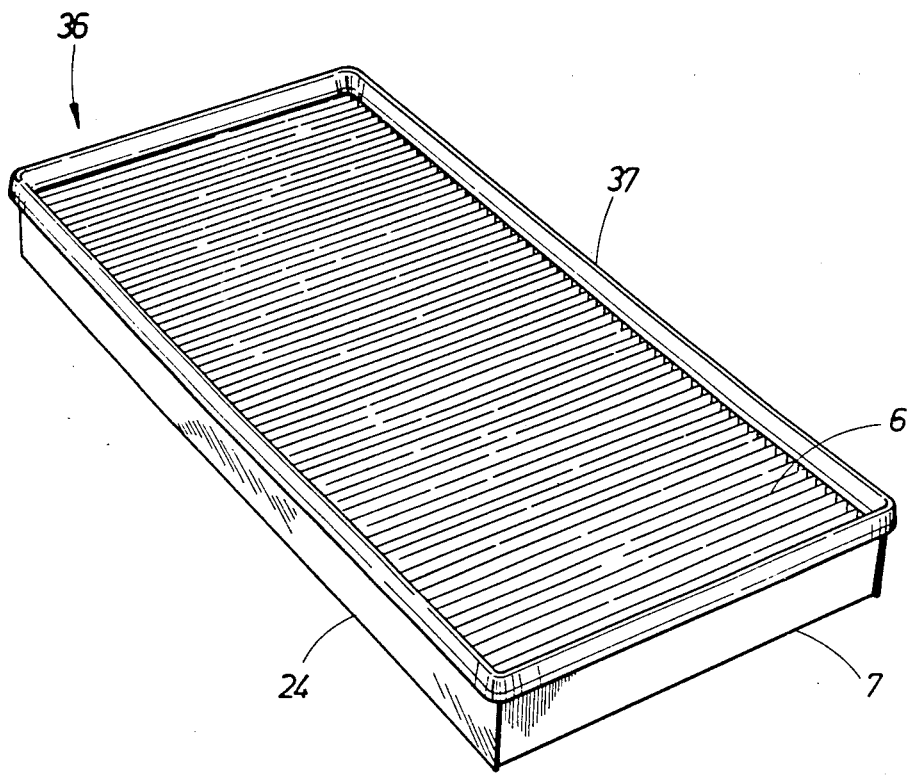
FIG. 4 shows a filter.

As shown in FIG. 4, a filter 36 manufactured by this method exhibits elongated edge parts of the strip material 24, in conjunction with which each of the ends of the filter consists of one of the pleats 39 of the filter material from the continuous length 5.

Also included in the production line is an injection casting arrangement (not shown in the drawings) for the casting of a sealing strip 37 extending peripherally around an upper edge part of the filter 36, as shown in FIG. 4, preferably made of an elastomer material such as foam rubber which is hot-cast directly onto the filter material.

The method for the manufacture of the filter 36 is now described with reference to FIGS. 1-4. As indicated above, the manufacture of the folds 6, 7, i.e. the so-called creases, takes place by means of the cylinders 1, 2, which also feed the continuous length of filter material 5 from the storage roll 10. The rotation of the cylinders relative to one another is adjusted so that, when contact is made by the contact surfaces of the respective cylinders against the continuous length of filter material 5, one of the folding strips 3 on the first cylinder 1 will at all times make contact above one of the recesses 4 on the second cylinder 2, in so doing forcing the continuous length of filter material 5 downwards, in conjunction with which the inner fold 6 is formed, and so that one of the folding strips 3 on the second cylinder 2 will at all times make contact towards the continuous length of filter material 5 above one of the recesses 4 on the first cylinder 1, in conjunction with which the continuous length of filter material is forced upwards so as to form the outer fold 7. Folding takes place alternately whilst the cylinders rotate continuously against one another. The depth of the pleats 39 is in this way directly dependent on the distance between the folding strip and the recess, so that different depths of folding for different types of filter can be produced by regulating this distance.

Thanks to the continuous manufacture of the folds 6, 7 by means of the cylinders, the continuous length of filter material 5 which has by now been creased is fed to the conveyor 40 and on towards the screw elements 18 arranged at the third station for onward transport through the aforementioned third station. The speed of rotation of the cylinders is dependent on the feed speed of the screw elements 18 for the pleated continuous length of filter material 5. The feed speed of the cylinders shall at all times be sufficiently high for the continuous length of filter material to be pleated and compressed when it is received by the conveyor 40, as shown in FIG. 2.

The continuous length of filter material thus forms a pleated length on the conveyor 40, and the pleats are brought into a state of uniformity by means of the rollers 41 in the manner described above.

The creased continuous length of filter material is thus fed by means of the conveyor 40 and the rollers 41 on towards the screw elements 18 at the third station above the supporting surface, in conjunction with which the mutual distance between the upright conveyors 9 slightly exceeds the width of the continuous length of filter material 5. The distance between the conveyors can be regulated by the lateral displacement of one of the conveyors towards the other conveyor by moving the guide roller 11a and the driving roller 11b along the supporting elements 12 on the supporting arm 8, in conjunction with which the gearing of the conveyor must also be adjusted so that the conical gear wheel 15 installed on the drive shaft 13 is loosened by means of the locking ring 16 and is moved to its new position in contact with the gear wheel of the drive shaft. The screw elements 18 are also capable of a certain amount of lateral displacement in order to adapt to the mutual distance between the conveyors, in conjunction with which the couplings 21 installed on the shafts 19 permit certain minor adjustments to be made to the mutual distance between the screw elements 18 without having to adjust the power source for the screw elements.

When the screw elements 18 rotate, the thread of the comb 20 is brought down into the space between two pleats, in so doing separating the pleats one from the other to a certain pre-determined distance depending on the pitch of the screw, the distance between the threads and the depth of the thread path. The creased continuous length of filter material 5 is screwed forwards by the screw elements 18 during contact with the belt conveyor 22 and is fed by the conveyor belts 38 of the conveyors 9 through contact with the strip material 24, which in turn is forced against the lateral edges of the continuous length of filter material 5. During this period the pleats are retained by the screw elements 18 at a certain distance from one another in an upright position and are preferably locked in a zig-zag pattern, when viewed from the side, during the period for which the screw elements 18 and the conveyors 9 are in engagement with the continuous length of filter material.

The position of the screw elements 18 in this case is advanced slightly relative to the position of the conveyors, so that the combs 20 enter into engagement with and separate the pleats for a moment before the conveyor belts 38 of the conveyors 9 enter into engagement with the continuous length of filter material 5, in conjunction with which the pleats are freely permitted to form the aforementioned zig-zag pattern on the supporting surface, before subsequently being fixed in their mutual position by means of the conveyors, the screw elements and the belt conveyor 22.

The screw elements 18 are assumed to rotate at a pre-determined speed, and this speed is recorded by means of the aforementioned apparatus 43. For each revolution they will take hold of one pleat on the continuous length of filter material, and it is accordingly important for the continuous length of filter material to be fed to the ends of the screws, so that neither excessive piling up of the pleats ahead of the screws, nor extension of the continuous length of filter material occurs to the extent that the screws are unable to take hold of a pleat. For this reason the feed speed must be adapted by means of the conveyor 40 to suit the speed of rotation of the screws. The apparatus 43 has been provided, as it can be difficult to regulate all the factors which determine the interaction between the input feed speed of the screw elements and the advance of the continuous length of filter material. This accordingly counts the number of pleats advanced per unit of time and compares these with the recorded number of revolutions of the screw elements. If the two values do not agree, the computer arrangement is so arranged as to regulate the drive motor 42 of the conveyor 40 in such a way as to achieve an advance of the continuous length of filter material which matches the input feed capacity of the screw elements. The computer arrangement can also be connected to the drive for the cylinders 1, 2, also enabling their speed to be regulated.

At the same time as the creased continuous length of filter material 5 is being advanced, and at the same speed, the strip material 24 is unwound from the storage drums 23 through the strip material being held securely between the conveyor belts 38 of the conveyors 9 and the lateral edges of the continuous length of filter material. Once the strip material has been unwound from the storage drums, each strip 24 is guided by means of the backing roller 25 in towards the shoe 26, which is so arranged relative to the aforementioned backing roller that the strip is in contact with the convex surface of the shoe as it advances, as shown in FIG. 1. The shoe is provided in this case with heating elements which heat the convex surface, which, through thermal conduction, in turn heats the strip 24 as it passes over the convex surface for the purpose of heating the line of adhesive applied to the strip from the automatic adhesive applicator 27, which adhesive is preferably of the hot-melt type. There is no requirement in this case, however, that the surface of the shoe should generate heat for the purpose of heating the strip, although the adhesive magazine 28 attached to the automatic adhesive applicator may be provided for this purpose with some previously disclosed type of heating element which will heat the holt-melt adhesive to a certain temperature for subsequent application to the strip via the automatic adhesive applicator 27. The line of adhesive will, in the event of the shoe 26 being heat-generating, exhibit a viscous nature as it is applied, in conjunction with which the line of adhesive will be caused to adopt a viscous state by means of heat, and, in the event of the adhesive magazine 28 being heat generating, will exhibit a viscous nature from the start. It is important in this respect for the line of adhesive, which exhibits a certain thickness, not to be caused to flow whilst the strip 24 is being advanced towards the creased continuous strip of filter material 5.

Each strip 24 is then advanced further over the second guide roller 29 with the adhesive-bearing surface facing away from the roller towards the continuous length of filter material 5 and in between the conveyor 9, which forces the adhesive-bearing surface against the lateral edges of the pleats which have been separated by the screw elements 18, in conjunction with which the setting line of adhesive forms a mass which, by being pressed out by the contact between the strip and the lateral edges, flows out between the lateral edges of the pleats and in this way forms spacer elements which fix the pleats in that position. The width of the strip in this case is at least the same as the distance between the inner fold 6 and the outer fold 7 on the creased continuous length of filter material in the upright position, so that the whole of the edge part of the continuous length of filter material is covered by the strip 24 and is fixed in the pre-determined position by means of the line of adhesive as it sets, whilst the continuous length of filter material is being advanced by the screw elements and the conveyors.

At the exit from the third station, that is to say at the exit from the conveyors 9 near the driving rollers 11b, the flying saw 30 acts intermittently along the longitudinal sense of the continuous length of filter material between two extreme positions, the speed of movement of which is synchronized with the feed speed of the continuous length of filter material in such a way that the saw 32, 33, when in its initial position at a certain distance from the driving rollers 11b of the conveyors, is in its first position on the guides 35, as shown in FIG. 1. The saw 32, 33 is moved along the guides 35 to the other side, and the circular saw blade 33 cuts through the creased continuous length of filter material 5, at right-angles to the longitudinal sense of the continuous length of filter material, whilst accompanying the advance of the continuous length of filter material, so that a straight cut is produced across the continuous length of filter material. The saw may appropriately be caused to advance by the upper side of one of the guides 35 exhibiting teeth, such as toothed bar, in which case the same motor 32 can drive both the circular saw blade 33 and the advance of the saw along the guide by the use of a certain pre-determined gear ratio. Once the continuous length of filter material has been sawn through and the saw 32, 33 has reached its second end position on the guides 35, as shown in FIG. 3, the flying saw will return to its initial position at the exit from the second station, and a new sawing cycle can be initiated depending on the pre-determined length of the finished filter 36. The filter 36 is formed in this way, and its longitudinal edges thus consist of strip material 24 and its ends of the folds 6, 7 in the filter material. The saw is able to work in both directions between the end positions of the guides 35, or simply in a single direction betwen the end positions of the guides.

Once the filter 36 has been formed by sawing into pre-determined lengths, this is removed for the casting of the sealing strip 37 at a station not shown in the drawings. This process involves pressing on a viscous mass, preferably of the foam rubber or plastic type, in such a way that there is formed, lying over the edge parts of the filter 36, a sealing strip 37 which, together with the strip material 24 applied to the lateral edges of the filter, forms a boundary to the suction surface of the filter, which sealing strip is intended to provide a tight seal against the wall parts of a filter housing designed to suit the dimensions of the filter.

A characteristic feature of the method described above is the accuracy of the distance between the creases which is achieved by means of the special screw elements, which, at the same time as they separate and advance the creased continuous length of filter material, constitute a fixture during the gluing of the strip material, in conjunction with which the strip material simultaneously seals the lateral edges and stabilizes the filter so that the filter material achieves very good attachment and a high resistance to pressure and vibrations without impairing the flow conditions for the medium through the filter. The service life of the filter can be increased considerably in this way, due to the fact that the creases tend not to collapse and the precise distance between the creases provides sufficient space for the medium to flow into the pleats, so that the entire surface area of the filter can be utilized to maximum effect and the choking of the filter by particles can be delayed.

The invention is not restricted to the illustrative embodiment, but may be modified within the scope of the following Patent Claims. Only the method for the manufacture of filters from a pleated continuous length of filter material is referred to above, although it should also be possible to apply the method involving the winding of the strip material onto the lateral edges of the filter to certain other types of filter, preferably those with a different type of profile design.

I claim:

1. An apparatus for manufacturing a pleated filter from a continuous band of filter material, said apparatus comprising a folding device for folding a continuous band of filter material into a folded band of filter material with folds having creases across the band and lateral edges lengthwise of the band; a supporting surface for receiving the folded band of filter material so that one side of the folded band is turned towards the supporting surface and the other side of the folded band is turned away from the supporting surface; at least one screw means above the supporting surface and having threads for spacing the creases on the side of the band turned away from the supporting surface at predetermined distances from each other; two conveyor means respectively arranged laterally of the screw means for feeding and for attaching strips to the lateral edges while said screw means threads are engaged to spaced the creases of the band to thereby secure the folds in position at the distances at which they are spaced by the screw means; and means for rotating the at least one screw means and for advancing the two conveyor means in synchronism with each other.

2. The apparatus according to claim 1, comprising two screw means spaced from each other across the band.

3. The apparatus according to claim 1, comprising cutting means arranged downstream of the conveyor means for cutting the pleated filter material into filters of predetermined length.

* * * * *